United States Patent Office 2,953,555
Patented Sept. 20, 1960

2,953,555

SOLVENT SEPARATION TREATMENT OF OLEFIN HYDROCARBON POLYMERS

Floyd F. Miller, Wadsworth, and David S. Conner, Avon Lake, Ohio, assignors to Goodrich-Gulf Chemicals, Inc., Cleveland, Ohio, a corporation of Delaware No Drawing. Filed Aug. 7, 1956, Ser. No. 602,494

7 Claims. (Cl. 260—94.7)

The present invention relates generally to the recovery of olefin polymers from their polymerization mixtures in hydrocarbon solvents. More specifically the invention relates to the treatment of olefin hydrocarbon polymerization mixtures containing hydrocarbon solvents so as to obtain an essentially solvent-free solid polymer.

Olefinic hydrocarbon monomers polymerize in hydrocarbon solvents containing organometallic catalysts with the production of high molecular weight polymers of great utility. For example, isoprene can be polymerized in a hydrocarbon solvent containing either (1) alkyl lithium compounds or (2) a "heavy metal organometallic catalyst," as catalysts. The products are highly soluble in most of the polymerization solvents and viscous cement-like final reaction mixtures usually are obtained from which the polymer can be precipitated by non-solvents such as alcohols, acetone and the like. However, the precipitated products obtained by this procedure, though crumb-like in form, are highly solvated (i.e. contain as much as 100 percent or more by weight of absorbed solvent), they are sticky and tend to agglomerate, and they tenaciously retain the solvent during drying. Moreover, relatively large amounts of solvent and alcohol are required for most of the known precipitation procedures. For example, in the copending application of Floyd F. Miller and Albert F. Ekar, Serial No. 555,299, filed December 27, 1955, there is disclosed a process for precipitating polyisoprene wherein the polyisoprene solution is added to a solvent/alcohol mixed solution wherein the solvent:alcohol ratio is carefully controlled in order to effect control of crumb particle size and prevent agglomeration. While this is a superior procedure in that it controls crumb particle size, such a process requires as much or more solvent in the coagulating medium as is utilized in the polymerization step.

The above-described polymer recovery operations are complicated by the presence in the polymer of metallic residues derived from the catalysts. The latter in many cases have deleterious effects on polymer properties unless removed. Thus, good processing economy requires that less solvent and alcohol per pound of polymer be utilized yet efficient catalyst extraction tends to require the use of more, rather than less solvent and alcohol. There exists a need, therefore, for a method of recovering the polymer as a solid crumb of controlled size, free of metal residues and essentially free of solvent, yet which does not require the use of excessively large quantities of solvent and alcohol.

According to the present invention these and other objects are obtained by a method wherein azeotropic distillation of solvent from a polymer slurry is utilized to extract the solvent and catalyst residues from the polymer. Distillation of the azeotrope formed by (1) the polymerization solvent and (2) a suitable organic non-solvent liquid additive such as an alcohol, acetone, etc. effectively removes the solvent content not only from the slurry liquid but also the solvent absorbed or adsorbed by the polymer. The azeotropic distillation has been found to be the only effective method for the essentially complete removal of polymer-absorbed solvent prior to drying. Such a method has many advantages including (1) less alcohol and solvent are required than in conventional decantation and re-slurry type extraction procedures, (2) the polymer is obtained in a physical state ideally adapted to handling by conventional synthetic rubber processing equipment such as screening, extruder drying, etc., (3) the temperatures obtaining with minimum boiling azeotropic mixtures are sufficiently low to minimize polymer degradation, and (4) there is obtained a warm slurry of polymer in non-solvent wherein the polymer has no tendency to agglomerate and the slurry can be pumped or blown from one piece of equipment to another during subsequent operations.

The process of the present invention is carried out in a step-wise manner including, as the essential steps, (1) addition to the polymer-containing solution or slurry an azeotrope-forming non-solvent organic liquid, (2) distilling off the solvent in the form of azeotropic mixture until the solvent content of the pot residue is at the desired low level, and (3) separating an essentially solvent-free polymer from the remaining liquid. Usually, it is desirable to carry the distillation to the point where the solvent content of the slurry is below about 10 percent, more preferably about 5 percent, by volume. Under these conditions the absorbed solvent content of the polymer will be very low.

In most cases it is preferred to utilize an alcohol as the non-solvent additive, particularly an alcohol which forms an azeotropic mixture boiling below about 80° C., most preferably below about 70° C. Where such an alcohol is employed the product obtained is a slurry of solvent-free polymer in alcohol which can be screened and the residual alcohol driven off by drying, or squeezing as in an extruder. The final polymer will be found to be very low in inorganic residue indicating the distillation procedure also effectively removes catalyst residue. Azeotrope-forming liquids such as water do not function effectively in the method of this invention because (1) the boiling point of the azeotropic will usually be too high, (2) the water does not wet the polymer and therefore does not function effectively in extracting catalyst from the solid polymer, and (3) water-wet polymer is many times more difficult to dry.

The process of this invention is particularly adapted to the treatment of solution polymerized polymers. If the polymer to be recovered is obtained from the polymerization step as a solution, the non-solvent such as an alcohol can either be added in sufficient quantity to precipitate the dissolved polymer, or a smaller quantity of alcohol can be added and removal of solvent by distillation employed to effect precipitation. The first procedure has the advantage that precipitation is effected under more easily controlled conditions before foaming during distillation can complicate control of particle size. The second procedure, if carefully carried out, required less alcohol.

Where the solution to be treated contains insoluble or only partially solvated polymer, the addition of alcohol will kill the catalyst, solvate the latter and de-solvate the solvated polymer so that the polymer obtained after distillation is harder, cleaner, lower in solvent and ash (metal) content, and is easier to dry.

The process of this invention is related to that of our copending application, S.N. 602,492, filed herewith. The latter application discloses a hot coagulation procedure whereby an alcohol and a hydrocarbon polymer solution are brought together at a temperature in excess of about 45° C. so as to effect precipitation without aggregation of the freshly precipitated particles. Such a process is based on the surprising phenomena that a hydrocarbon polymer is completely non-tacky in warm alcohol (45° C. or higher) whereas at lower temperatures agglomeration readily occurs.

The present process also makes use of the same property, since azeotropic distillation of a polymer solution or slurry is possible because the hydrocarbon polymers do not aggregate at temperatures above about 45° C. Where the azeotropic boiling point of the solvent and alcohol being employed is below about 45° C. aggregation of the slurry crumbs can be prevented by the use of a small proportion of an anti-sticking agent such as zinc stearate, carbon black, bentonite clay, etc., such as is disclosed in our copending application, S.N. 602,493, filed herewith.

The polymerization of the monoolefinic hydrocarbons such as ethylene in the presence of the heavy metal organo metallic catalysts is described more fully in the copending application of Karl Ziegler, et al., Serial No. 469,059, filed November 15, 1954. The polymerization of dienes such as isoprene in the presence of similar heavy metal organometallic catalyst made by combining a titanium tetrahalide with a trialkyl aluminum is described in the copending application of Samuel E. Horne, Jr., Serial No. 472,786, filed December 2, 1954; in the copending application of Carlin F. Gibbs et al., Serial No. 503,027, filed April 21, 1955; and in the copending application of Earl J. Carlson, Serial No. 503,028, filed April 21, 1955. The polymerization of 2-substituted butadiene-1,3 hydrocarbons in the presence of alkyl lithium/lithium metal and lithium "alfin" catalysts is disclosed, respectively, in the copending applications of Harold Tucker and Hugh E. Diem, Serial Nos. 557,826 and 557,862, filed January 9, 1956. As is shown in copending applications, Serial Nos. 503,027 and 503,028, mentioned above, the periodic arrangement of elements referred to above, occurs on pages 340 and 341 of the "Handbook of Chemistry and Physics," 33rd Ed., published by the Chemical Rubber Publishing Co., Cleveland, Ohio.

Briefly, the heavy metal organometallic catalysts referred to above comprise a metal of the 4th to 10th positions of the long period of the periodic arrangement of elements in short and long periods in which the alkali metals occupy the first position, and an organometallic constituent such as an alkyl aluminum compound. Such catalysts are formed by reacting a compound of a heavy metal of the class described such as $TiCl_4$ with a trialkyl aluminum compound. Butyl lithium alone or butyl lithium plus metallic lithium is an example of the lithium style catalysts.

The above types of polymerization are conducted in closed vessels under inert atmospheres of nitrogen, argon, helium or hydrocarbon vapor. The catalyst, solvent and monomers are combined in any manner and the reaction conducted at temperatures generally below about 80° C. When the polymerization is complete the catalyst (the heavy metal type, especially) must be inactivated before exposing the polymer to oxygen of the atmosphere. This is usually accomplished by adding at least a stoichiometrical amount of alcohol, water, amine, acetone, carboxylic acid, chelating agent, and the like.

When the polymer is insoluble, or only partially soluble the catalyst should also be inactivated by the addition of an appropriate reagent. In any of these procedures catalyst inactivation, as a separate step, can be omitted since the first alcohol addition step of the process of this invention will also effectively kill the catalyst.

The solvents utilized in the above-described polymerization procedures are hydrocarbons including propane, propylene, butane, isobutylene, pentane, hexane, heptane, "Deobase" kerosene, and other aliphatic hydrocarbons; benzene, toluene, xylene and other aromatic hydrocarbons; and cyclohexane and other cycloaliphatic hydrocarbons. In some cases, an excess of the monomeric hydrocarbon being polymerized can be employed as the solvent.

Monomers which are most easily polymerized with the heavy metal organometallic catalysts are the 1-olefinic hydrocarbons such as ethylene, propylene, isobutylene, 1-pentene, 1-hexene, 1-heptene, 1-decene, styrene, and other 1-monoolefins; open-chain, aliphatic conjugated dienes such as butadiene, isoprene, piperylene, 2-ethylbutadiene-1,3, 2-phenyl-butadiene-1,3, and many others; certain alicyclic conjugated dienes such as cyclopentadiene-1,3; and many others.

Both the alkyl lithium and heavy metal organometallic catalysts have unique directive effects on the 2-substituted butadiene-1,3 hydrocarbons wherein there is present a hydrocarbon substituent, such as methyl, ethyl, phenyl, etc., attached to the No. 2 carbon atom, and only on the No. 2 carbon atom. These catalysts will cause such diolefin monomers to link-up in a head-to-tail fashion in what is known as the 1,4 structure. The alkyl lithium catalysts will produce a polymer which contains at least 90 percent of the cis 1,4 structure. The heavy metal organometallic catalysts are slightly more versatile since they will polymerize a wider variety of monomers and are capable of producing an essentially all-cis-1,4, an essentially all-trans-1,4, or mixed cis- and trans- all-1,4 polymer structure from the above dienes.

In the method of this invention the first step, following polymerization, is to add alcohol to the reaction mixture if the latter has not already been so treated. The amount of alcohol to be added is not critical, all that is required is just enough to allow one to begin removal of a solvent/alcohol azeotrope. Usually, less than about 10 percent or 20 percent by volume of the polymer solution will be sufficient for this purpose. As little as about 5 percent can be employed. Distillation can then be commenced. If the polymer has not precipitated when distillation is commenced, distillation should be conducted with care until it does occur to minimize foaming. When the polymer has precipitated distillation can proceed at an increased rate.

The better procedure is to add sufficient alcohol to cause precipitation before distillation is begun. This is accomplished by adding the alcohol, more preferably a solvent/alcohol mixture, to the polymer solution in a gradual manner while agitating the solution. A still more effective procedure is to heat the polymer solution to a temperature above about 45° C. and then carefully add pure alcohol to effect precipitation at the elevated temperature. The latter procedure is more fully disclosed in our above-mentioned copending application, Serial No. 602,492, filed herewith.

The proportion of alcohol required to effect precipitation will vary somewhat depending on the solvent and alcohol employed, although usually about 20 percent to about 40 percent by volume will be sufficient. For precipitation the alcohol should be miscible with the solvent and, for the purposes of this invention, it should also form a low-boiling azeotropic mixture therewith, as indicated above. Alcohols which are not sufficiently miscible with the solvent as to effect precipitation can be employed in this invention (providing of course they form an azeotrope) if sufficient solvent is distilled off to throw the polymer out of solution. The latter procedure, however, is more difficult to control.

Monohydric alcohols containing less than about 4 carbon atoms are generally preferred.

It is possible to select a hydrocarbon solvent and an alcohol which form solvent-rich azeotropic mixtures which boil at suitably low temperatures. For example, benzene and methanol form a minimum boiling azeotrope which boils at atmospheric pressure at about 57° C. and which contains about 60 percent benzene. Another particularly advantageous combination is hexane/methanol which forms an azeotrope of 72 percent hexane and 28 percent methanol which boils at about 50° C. Pentane and methanol form an azeotrope containing 91 percent pentane and 9 percent methanol boiling at about 30.8° C. In addition, other useful combinations are heptane/ethanol (51 percent heptane and 49 percent ethanol boiling at 71° C.); toluene/methanol (31 percent toluene and 69 percent methanol boiling at about 63.8° C.); heptane/methanol (48.5 percent heptane and 51.5 percent methanol boiling at about 59° C.); and others. Where the azeotropic boiling point is somewhat too high, the use of moderately reduced pressures usually will reduce the boiling point to a more reasonable value less harmful to the polymer. However, temperatures of less than about 80° C. can usually be tolerated by even the unsaturated diene polymers.

As indicated above, the distillation should be continued until the slurry liquid contains less than about 10 percent, more preferably below about 5 percent, of solvent. Under these conditions the slurry polymer particles will usually contain less than about 1 or 2 percent residual solvent. Of course, as the distillation proceeds it is desirable to replace the lost volume by adding alcohol. The final pot residue after distillation is complete is a slurry of polymer in essentially pure alcohol. The slurry particles will be saturated with alcohol which is easily recovered by squeezing the polymer. Such a procedure, involving several passes through a heated extruder, reduces the alcohol content of the polymer below about 2 percent.

The distillate is easily separated into its components for reuse by a simple water washing step to recover the alcohol. The water-washed solvent and aqueous alcohol extract streams are then redistilled to obtain polymerization grade solvent and essentially pure alcohol which can be recycled to the process. In many cases the last fractions of distillate, which are low in solvent, can be recycled directly to the coagulation step without purification, thereby further reducing solvent and alcohol recovery loss.

Following the distillation step the polymer should be separated from the slurry liquor. As pointed out above, in most cases this is best carried out while the slurry is warm in order to prevent agglomeration of the crumbs. Separation of the crumbs can be carried out by screening, centrifuging, decanting, or by other filtration techniques. If it is desired to still further reduce the already low inorganic residue content of the polymer, the separated crumbs can be washed or reslurried in fresh alcohol. Finally, the polymer is dried in an air oven, vacuum oven, or in an extruder, etc. Stabilizers, antioxidants, filters, pigments, etc., can be incorporated in the polymer at any stage subsequent to precipitation.

The invention will now be described more fully in connection with several specific examples which are intended as illustrative only.

*Example I*

In this example a solution in benzene of an essentially all cis-1,4, high molecular weight polyisoprene is freed of benzene in the azeotropic distillation process of this invention. The cement-like polymer solution is prepared by the process of copending application, Serial No. 472,786 wherein thiophene-free coal tar benzene is added to a sealed autoclave (which has been first cleaned, dried and flushed with dry $O_2$-free nitrogen) and then 6 to 8 percent on the benzene of monomeric isoprene is added thereto. Sufficient triisobutyl aluminum is then added followed by the addition of 6.7 millimoles of $TiCl_4$ per liter of benzene (Ti/Al ratio of about 0.85:1). Upon addition of the $TiCl_4$ the solution turns dark brown and a reddish brown precipitate forms. Reaction ensues and the temperature is maintained at about 5° C. to produce a very dark brown, quite viscous cement containing about 6 percent by weight of an all cis-1,4 polyisoprene.

The resulting cement is added to an excess of deoxygenated water under a nitrogen atmosphere. The catalyst reacts with the water and passes into solution in the water layer. The resulting water white benzene cement layer is separated and washed with several additional fresh portions of water. Analysis of the water-washed cement at this point shows that it contains less than about 0.1 percent inorganic ash content.

The water-washed cement is coagulated by adding the cement to a 3:1 mixture of benzene and methanol contained in a flask fitted with a stirrer and a water-cooled condenser, meanwhile adding pure methanol in small portions to maintain the benzene:methanol ratio at 3:1. The cement coagulates on striking the coagulating bath forming a slurry of crumbs about ¼" in diameter. The coagulum is quite voluminous and when the individual crumbs are closely examined they are found to be highly swollen with benzene. A sample of crumb taken at this point shows a weight loss of about 100 percent. As soon as the addition of the cement is complete the slurry is heated to about 57° C. Condensate then appears in the condenser and is collected and set aside for the recovery operations. Before the distillation has materially reduced the methanol content of the slurry, methanol addition is commenced at a rate just slightly less than the rate of distillation. Distillation and addition of methanol is continued until the rise in vapor temperature indicates that the slurry liquid contains less than about 2 percent by volume of benzene. As distillation progresses a noticeable shrinkage in the volume occupied by the coagulum is observed, the final volume being about half the volume of the freshly precipitated crumbs. Before the slurry has had an opportunity to cool it is poured into a screen to screen out the crumbs. On visual examination the crumbs are found to be firm and have no detectable odor of benzene. They have a markedly reduced tendency to agglomerate while warm and are easily reslurried in fresh, warm methanol to remove the final traces of the coagulation liquor. The product is then dried to a weight loss (methanol) of only about 2 percent by four passes through an extruder having barrel and screw heated to about 180° F. Analysis of the final dried polymer shows it to contain at most only a few hundredths of one percent ash content. The polymer is satisfactory for electrical applications.

*Example II*

In the preceding example, the slurry treated was one which had been first coagulated by means of the mixed solvent/alcohol coagulating medium. In this example, a water-washed benzene cement of all cis-1,4 polyisoprene substantially similar to that of the preceding example is coagulated during the solvent stripping operation. In this example, a 388 gram portion of water-washed cement is placed in a distillation flask and 30 ml. of methanol added thereto. Heat is applied to the flask and the agitator is operated at a moderate speed. As the cement warms up it noticeably thins out and becomes quite fluid, an effect largely due to the methanol addition and not to the rise in temperature alone. When the cement temperature reaches about 57° C. condensate starts coming over. Shortly thereafter the addition of a small stream of methanol is commenced to compensate for the lost volume. As distillation progresses the warm liquor soon develops a precipitate in the form of quite small, "tight" crumbs of polyisoprene. In a short time precipitation is complete and the rate of distillation and methanol addition is increased. When the slurry liquor contains less than about 5 percent benzene the distillation is terminated and the slurry, before it has an opportunity to cool, is poured into an open screen. The crumbs are very fine and quite firm and non-sticky. The polymer is then reslurried in alcohol, screened and then extruder dried as described above. This product also has an ash content well below 0.10 percent.

*Example III*

In this example the azeotropic distillation step is combined with a hot alcohol coagulation step in order to effect still further solvent and alcohol economies and to effect a better control over the slurry crumb size. In this experiment the benzene cement is not pretreated with a catalyst inactivator but about 925 grams of the cement containing "live" (triisobutyl aluminum/TiCl$_4$) catalyst is placed in a flask under a nitrogen atmosphere and heat is applied thereto. When the temperature of the cement reaches 50° C. addition of methanol in a small continuous stream is commenced and the rate of heating is regulated to hold the temperature at about 50° C. The first addition of methanol thins the cement and permits a considerably higher rate of agitation. When about 300 ml. of methanol have been added a very fine, discrete crumb (particles about 1/16" in diameter) forms in the agitated mixture. Methanol addition is continued and the rate of heating increased. When only about 30 to 50 ml. additional methanol has been added it is observed that the volume occupied by the crumbs has been drastically reduced although the apparent crumb size does not appear to be changed materially. When the temperature reaches about 57° C. condensate begins to collect in the receiver. Distillation and methanol addition is continued until the temperature rise indicates substantial exhaustion of the benzene content of the slurry. The crumbs thus obtained are very firm and are considerably smaller than those obtained in the preceding examples. After screening, the still warm crumbs evidence relatively little tendency to pack together and can be transported in layers of considerable depth. When the procedure of Example III is repeated using ethanol, an azeotropic mixture containing about 67 percent benzene and boiling at about 68° C. can be removed. Though higher in cost, less ethanol is required than of methanol, and the alcohol cost may be about the same.

*Example IV*

In this example the various procedures of the foregoing examples for coagulating the benzene-polyisoprene cements are compared as to the total amounts of benzene and methanol required. The first procedure is the mixed benzene/methanol coagulation procedure of Example I, the quantities of benzene and methanol being taken before a distillation step. The second procedure is one described in copending application S.N. 602,493, described above, involving the use of zinc stearate in an extractive decantation procedure which results in an essentially benzene-free crumb. The third procedure is the hot coagulation/azeotropic distillation procedure of Example III. The amounts of solvent and alcohol are expressed as lbs./lb. of polymer. The weight balance data are as follows:

| Material | First Procedure | Second Procedure | Example III |
|---|---|---|---|
| Benzene (lbs.) | 28.7 | 20.3 | 13.0 |
| Methanol (lbs.) | 14.2 | 16.3+(9.7)* | 9.8+(16.2)* |
| Total (lbs.) | 42.9 | 36.6+ 9.7)* | 22.8+ 16.2)* |

In the above data the quantities indicated by an asterisk (*) are recycled to the coagulation step since they are tailing very high in methanol content. It should be noted that the procedure of Example III requires only about ½ the total recoverable solvent and alcohol that the first and second procedures require. It should be borne in mind that the "First" procedure produces a benzene-saturated crumb containing 100 percent benzene while the other two procedures produce a benzene-free crumb. If the "first" procedure were extended to produce a benzene-free crumb considerably larger quantities of solvent and alcohol would be required.

*Example V*

A cement of all cis-1,4 polyisoprene in hexane is prepared by polymerization in freshly distilled hexane which had first been treated with sulfuric acid, washed with water and then dried. The polymerization recipe, catalyst and procedure is similar to that of Example I. The final cement is quite viscous and contains about 6 percent solids. The catalyst is inactivated by the addition of a slight stoichiometrical excess of triethanolamine and the cement is then charged to a nitrogen-filled vessel equipped with a heating jacket, an agitator and a water-cooled condenser. Heat is applied to the pot and a small stream of methanol is added while agitating the cement. When the temperature reaches 45 to 50° C. the rate of heating is reduced to hold the temperature just below boiling. Some time after a total of 25 percent by volume of methanol has been added precipitation of the polymer occurs, the crumbs being fine but highly solvated. The temperature is then raised to about 51° C. to start the distillation, meanwhile continuing to add methanol at a rate somewhat less than the rate of distillation. In a short time the rise in vapor temperature indicates substantial exhaustion of the hexane content of the slurry. At this point the crumb volume is considerably reduced and the crumbs are quite firm. The latter are then separated by screening the warm slurry and dried by repeated passage through an extruder. The dried polymer is very low in ash content.

*Example VI*

The hexane/methanol system of Example V is compared with the benzene/methanol system of Examples I to IV and also with pentane/methanol and n-heptane/methanol systems as to the pounds of solvent which will be removed from the slurry for every one pound of methanol employed. The data are as follows:

Lbs./lb. of CH$_3$OH
n-Pentane _____ 10.1
n-Hexane _____ 2.57
n-Heptane _____ 0.94
Benzene _____ 1.52

*Example VII*

In this example a slurry of crystalline high molecular weight polyethylene in benzene is prepared by adding about 3 millimoles of TiCl$_4$ per liter and 6 millimoles per liter of hydride-free diisobutyl aluminum chloride and then bubbling ethylene through the resulting clear catalyst solution. The product is a fluid slurry of granular polyethylene containing about 12 to 15 percent solids. While maintaining a nitrogen atmosphere over the charge, about 25 percent of methanol is added with agitation. The resulting mixture is then heated to about 57° C. and a benezene/methanol azeotrope is removed through a condenser. At intervals the lost volume is replaced with pure methanol. When the benzene has been stripped out the alcohol slurry is pumped to a centrifuge. The cake in the basket is washed with small quantities of pure methanol and the resulting cake is then discharged into a heated extruder. After several passes through the extruder the methanol content of the product is very low. The dried polymer is clear, colorless and has an ash content well below 0.1 percent. When molded for 1 minute at 400° F. clear, whitish disks are formed which are free of the blackish, grayish or brownish discolorations evidenced by improperly extracted polymer.

*Example VIII*

An all trans-1,4 polybutadiene is prepared by polymerization in toluene using a triisobutyl aluminum/titanium tetrachloride catalyst similar to that of Example I but having a Ti/Al ratio of 2:1 with a titanium concentration of about 20 millimoles per liter of toluene. After polymerization is complete, a quite viscous, dark brown cement is obtained. While carefully excluding air, the cement is heated and a small proportion (i.e. about 5 to 10 percent by volume) of methanol added.

Methanol addition is resumed when the temperature of the cement reaches 45 to 50° C. and the rate of heating is reduced somewhat to prevent distillation. Precipitation of the polymer in the form of a fine crumb occurs at a toluene/methanol ratio of about 2:1. The rate of heating is then resumed and when distillation begins, a small stream of methanol is added to replace the lost volume. Distillation is continued until the vapor temperature (63–64° C.) indicates that essentially pure methanol is coming over. The product is a slurry of fine, non-sticky crumbs. The warm slurry is screened and the screened crumbs dried in a vacuum drier at about 50° C. The dry polymer is low in ash content and has excellent balata-like properties when suitably compounded and vulcanized.

*Example IX*

In this example, a solution of cis-1,4 polyisoprene in n-heptane is prepared by a procedure similar to that of Example I. The resulting thick brown cement is placed in a distillation flask under nitrogen and about 10 percent by volume of ethanol is added thereto. Heat is then applied and the cement held at 50° C. A small stream of pure ethanol is then added thereto until coagulation occurs at a heptane/ethanol ratio of about 3/1. The temperature is then increased to around 71° C. and the resulting distillate collected. A slow stream of pure ethanol is added during distillation to make up the lost volume. Stripping is continued until an essentially heptane-free slurry is obtained. The use of ethanol or isopropanol is required with heptane since methanol is not miscible with heptane in sufficient proportion to effect efficient precipitation of the polymer.

*Example X*

A hexane cement of polyisoprene containing live catalyst is hot coagulated with isopropanol and then azeotropically distilled to produce a hexane-free slurry of fine polymer crumbs. Almost three pounds of hexane are removed for every pound of isopropanol consumed in the distillation step conducted at about 63° C.

Even more favorable is the system hexane/n-propanol which forms an azeotrope made up of 96 percent hexane and 4 percent n-propanol boiling at about 66° C.

We claim:

1. The method of obtaining an essentially solvent-free solid polymer by treating a slurry of solid, particulate polyisoprene in a mixture of a hydrocarbon solvent, a 1 to 4 carbon atom monohydric alcohol forming an azeotropic mixture with said solvent boiling below 80° C., and residues of the reaction products of said alcohol with a catalyst made by combining a titanium tetrahalide and a trialkyl aluminum, which method comprises distilling said azeotropic mixture away from said polyisoprene at a temperature above about 45° C. while replacing the lost volume with said alcohol, separating said solid polyisoprene from the remaining liquor when the solvent content of the latter is below about 5% by volume and the solvent content of the polymer is below about 2% by weight, and washing the last traces of said liquor from the separated polymer with fresh portions of said alcohol above about 45° C.

2. The method of claim 1 wherein said solvent is benzene and said alcohol is methanol.

3. The method of claim 1 wherein said solvent is hexane and said alcohol is methanol.

4. The method as defined in claim 1 wherein the said solvent is heptane and the said alcohol is ethanol.

5. The method of claim 1 wherein the said solvent is pentane and said alcohol is methanol.

6. The method of obtaining an essentially solvent-free and metal-free solid polymer by the treatment of a slurry of solid polymer of an open-chain, aliphatic conjugated 1,3-diene in a mixture consisting of hydrocarbon solvent, a 1 to 4 carbon atom monohydric alcohol forming an azeotropic mixture boiling below 80° C. with said solvent, and the reaction products of said alcohol with a heavy metal organometallic catalyst containing a heavy metal of the 4th to 10th positions of the long periods of the periodic arrangement of the elements in short and long periods, which method comprises distilling said azeotropic mixture away from said polymer at a temperature above about 45° C. to maintain said slurry form while adding said alcohol in sufficient quantity to form said azeotropic mixture and to maintain fluidity, separating said solid polymer from the remaining liquor after the said distillation and alcohol addition have reduced the said solvent content thereof to less than about 5% by volume and the solvent content of the said polymer to less than about 2% by weight, and washing the last traces of said liquor from the separated polymer with fresh portions of said alcohol above at a temperature above about 45° C.

7. The method as defined in claim 6 wherein said diene is butadiene, said solvent is toluene, and said alcohol is methanol.

References Cited in the file of this patent

UNITED STATES PATENTS

| | | |
|---|---|---|
| 2,683,139 | Leary et al. | July 6, 1954 |
| 2,728,758 | Field et al. | Dec. 27, 1955 |
| 2,832,759 | Nowlin et al. | Apr. 29, 1958 |
| 2,915,514 | Denkowski | Dec. 1, 1959 |

UNITED STATES PATENT OFFICE

CERTIFICATE OF CORRECTION

Patent No. 2,953,555 September 20, 1960

Floyd F. Miller et al.

It is hereby certified that error appears in the printed specification of the above numbered patent requiring correction and that the said Letters Patent should read as corrected below.

Column 7, line 63, for "tailing" read -- tailings --.

Signed and sealed this 25th day of April 1961.

(SEAL)
Attest:
ERNEST W. SWIDER

Attesting Officer

DAVID L. LADD

Commissioner of Patents